US012662058B2

(12) United States Patent
Oh et al.

(10) Patent No.: US 12,662,058 B2
(45) Date of Patent: Jun. 23, 2026

(54) VEHICLE REAR COMPARTMENT STORAGE PANEL SYSTEM

(71) Applicant: GM GLOBAL TECHNOLOGY OPERATIONS LLC, Detroit, MI (US)

(72) Inventors: Sungho Oh, Seo-gu (KR); Eunsuk Yang, Incheon (KR); Boeui Kim, Seoul (KR); Yong-kyu Kim, Seo-gu (KR)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 323 days.

(21) Appl. No.: 18/407,812

(22) Filed: Jan. 9, 2024

(65) Prior Publication Data

US 2025/0222873 A1 Jul. 10, 2025

(51) Int. Cl.
B60R 5/04 (2006.01)
B60R 11/00 (2006.01)

(52) U.S. Cl.
CPC ....... B60R 5/045 (2013.01); B60R 2011/0024 (2013.01); B60R 2011/0036 (2013.01)

(58) Field of Classification Search
CPC ........... B60R 5/045; B60R 5/044; B60R 5/04; B60R 2011/0024; B60R 2011/0036

USPC ..... 296/24.44, 24.43, 37.5, 37.8, 37.16, 191
See application file for complete search history.

(56) References Cited

U.S. PATENT DOCUMENTS

| | | | | |
|---|---|---|---|---|
| 6,926,062 | B2 * | 8/2005 | Neumann | B60J 7/223 296/180.1 |
| 7,281,742 | B2 * | 10/2007 | Porter, II | B60R 5/04 296/37.16 |
| 7,762,602 | B2 * | 7/2010 | Bohlke | B60R 5/045 296/37.16 |
| 2017/0144607 | A1 * | 5/2017 | Utsunomiya | B60R 5/048 |

* cited by examiner

*Primary Examiner* — Roger L Pang
(74) *Attorney, Agent, or Firm* — Ingrassia Fisher & Lorenz, LLP | IF&L

(57) ABSTRACT

A storage panel system for a rear compartment of a vehicle includes a cover, and a panel frame assembly configured to be rotatably coupled to the rear compartment. The panel frame assembly defines a central opening and includes a first frame that overlies a second frame. At least a portion of the cover is sandwiched between the first frame and the second frame such that a remainder of the cover spans the central opening.

20 Claims, 14 Drawing Sheets

VEHICLE REAR COMPARTMENT STORAGE PANEL SYSTEM

INTRODUCTION

The technical field generally relates to storage panel systems for vehicles, and more particularly relates to a storage panel system for a rear compartment of a vehicle.

A vehicle may be configured with a rear liftgate, which is movable relative to the vehicle to provide access to a rear storage area or rear compartment. In certain instances, it may be desirable to enclose the rear compartment to protect the contents of the rear compartment from view. In these instances, a storage panel may be used, which cooperates with the liftgate to enclose the rear compartment and protect the contents of the rear storage area from view. Due to the size of the rear compartment, in certain instances, the storage panel may sag or wrinkle, which is undesirable. In addition, as the liftgate rotates relative to the vehicle, it may also be desirable for the storage panel to pivot with the liftgate to provide ease of access to the rear compartment. In certain instances, it may be difficult to incorporate pivots into the storage panel.

Accordingly, it is desirable to provide a storage panel system for a rear compartment of a vehicle, which spans the rear compartment without sagging or wrinkling and enables the incorporation of pivots to enable the storage panel system to pivot with the liftgate. Furthermore, other desirable features and characteristics of the present disclosure will become apparent from the subsequent detailed description and the appended claims, taken in conjunction with the accompanying drawings and the foregoing technical field and background.

SUMMARY

According to various embodiments, provided is a storage panel system for a rear compartment of a vehicle. The storage panel system includes a cover, and a panel frame assembly configured to be rotatably coupled to the rear compartment. The panel frame assembly defines a central opening and includes a first frame that overlies a second frame. At least a portion of the cover is sandwiched between the first frame and the second frame such that a remainder of the cover spans the central opening.

The cover is composed of a textile, and the first frame and the second frame are composed of a polymer-based material. The portion of the cover is wrapped around the first frame and the remainder of the cover overlies the first frame. The first frame includes a first side opposite a second side, and the portion of the cover is wrapped around the first side such that at least one terminal end of the cover is sandwiched between the second side of the first frame and the second frame. The second side of the first frame includes a pair of flanges and a plurality of first ribs that include a central rib and a plurality of reinforcing ribs that are misaligned relative to the central rib, and the plurality of reinforcing ribs interconnect the pair of flanges to the central rib. The second side of the first frame includes a boss, a third side of the second frame that faces the second side of the first frame includes a fastener bore, the fastener bore at least partially receives the boss and a mechanical fastener is coupled to the fastener bore and the boss. The storage panel system includes at least one tether. The second frame includes at least one tether anchor and at least one pivot receptacle defined substantially opposite the at least one tether anchor. The at least one tether anchor receives the at least one tether to couple the at least one tether to the panel frame assembly and the at least one pivot receptacle is configured to receive a pivot pin associated with the rear compartment to movably couple the storage panel system to the rear compartment. The second frame includes a plurality of second frame members, and the at least one pivot receptacle is defined on one of the plurality of second frame members and the at least one tether anchor is defined on another one of the plurality of second frame members. A region defined between an interior side of the cover and a fourth side of the second frame is devoid of structural members.

Further provided is a vehicle. The vehicle includes a cabin defining a passenger compartment and a rear compartment aft of the passenger compartment. The rear compartment includes at least one pivot pin. The vehicle includes a storage panel system to cover a portion of the rear compartment. The storage panel system includes a cover, and a panel frame assembly that defines a void central opening. The panel frame assembly includes a first frame that overlies a second frame. The second frame includes at least one pivot receptacle configured to be rotatably coupled to the at least one pivot pin, and at least a portion of the cover is sandwiched between the first frame and the second frame such that a remainder of the cover spans the central opening.

The cover is composed of a textile, and the first frame and the second frame are composed of a polymer-based material. The portion of the cover is wrapped around the first frame. The first frame includes a first side opposite a second side, the portion of the cover is wrapped around the first side such that at least one terminal end of the cover is sandwiched between the second side of the first frame and the second frame. The second side of the first frame includes a pair of flanges and a plurality of first ribs that include a central rib and a plurality of reinforcing ribs that are misaligned relative to the central rib, and the plurality of reinforcing ribs interconnect the pair of flanges to the central rib. The second side of the first frame includes a boss, a third side of the second frame that faces the second side of the first frame includes a fastener bore, the fastener bore at least partially receives the boss and a mechanical fastener is coupled to the fastener bore and the boss. The vehicle includes at least one tether. The second frame includes at least one tether anchor, and the at least one pivot receptacle is defined substantially opposite the at least one tether anchor. The at least one tether anchor receives the at least one tether to couple the at least one tether to the panel frame assembly and the at least one pivot receptacle is configured to receive a pivot pin associated with the rear compartment to movably couple the storage panel system to the rear compartment. The second frame includes a plurality of second frame members, and the at least one pivot receptacle is defined on one of the plurality of second frame members and the at least one tether anchor is defined on another one of the plurality of second frame members. A region defined between an interior side of the cover and a fourth side of the second frame is devoid of structural members.

Also provided according to various embodiments is a vehicle. The vehicle includes a cabin defining a passenger compartment and a rear compartment aft of the passenger compartment. The rear compartment includes at least one pivot pin. The vehicle includes a storage panel system to cover a portion of the rear compartment. The storage panel system includes a cover composed of a textile, and a panel frame assembly that defines a void central opening. The panel frame assembly includes a first frame that overlies a second frame composed of a polymer-based material. The second frame includes at least one pivot receptacle configured to be rotatably coupled to the at least one pivot pin and at least one tether anchor opposite the at least one pivot receptacle. The cover is wrapped around the first frame such that at least a portion of the cover is sandwiched between the first frame and the second frame, and the cover spans the central opening.

The first frame includes a first side opposite a second side, the cover is wrapped around the first side such that at least one terminal end of the cover is sandwiched between the second side of the first frame and the second frame, and a remainder of the cover spans the central opening.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, brief summary or the following detailed description. In addition, the connecting lines shown in the various figures contained herein are intended to represent example functional relationships and/or physical couplings between the various elements. It should be noted that many alternative or additional functional relationships or physical connections may be present in an embodiment of the present disclosure.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "about" denotes within 10% to account for manufacturing tolerances. In addition, the term "substantially" denotes within 10% to account for manufacturing tolerances.

Figure 1:
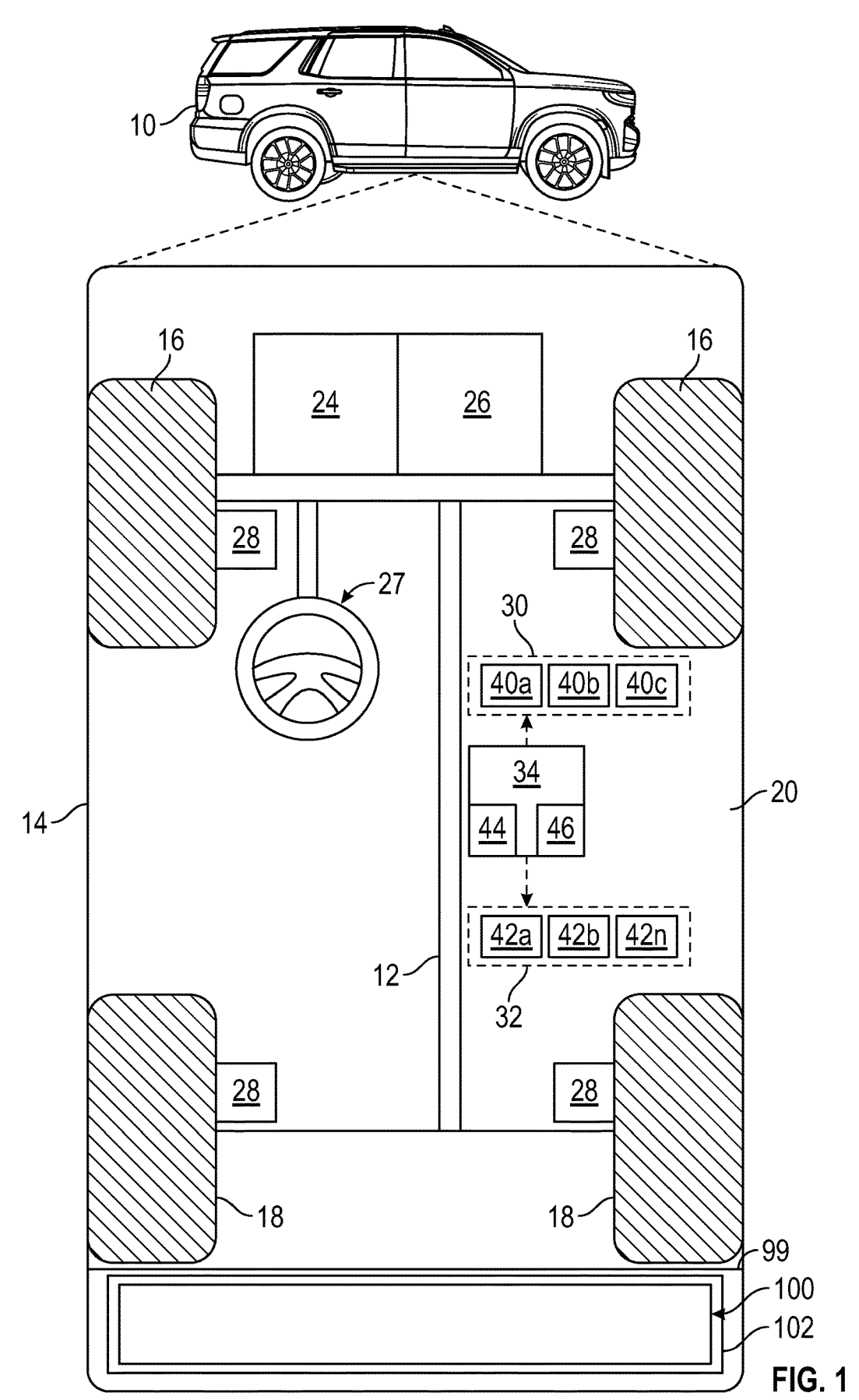
FIG. 1 is a functional block diagram illustrating a vehicle including an exemplary storage panel system for use with a rear storage area or rear compartment of the vehicle in accordance with various embodiments.

With reference to FIG. 1, a storage panel system shown generally as 100 is associated with a vehicle 10 in accordance with various embodiments. The storage panel system 100 cooperates with a liftgate 99 to substantially enclose a rear stowage area or rear compartment 102. As will be described, the storage panel system 100 spans the rear compartment 102 without sagging or wrinkling of the storage panel system 100, while also enabling the storage panel system 100 to be rotatably coupled to the vehicle 10.

As depicted in FIG. 1, the vehicle 10 generally includes a chassis 12, a body 14, front wheels 16, and rear wheels 18. The body 14 is arranged on the chassis 12 and substantially encloses components of the vehicle 10, including a passenger cabin shown generally as 20 and the rear compartment 102. The body 14 and the chassis 12 may jointly form a frame. The vehicle wheels 16-18 are each rotationally coupled to the chassis 12 near a respective corner of the body 14. In various embodiments, the vehicle 10 is an autonomous vehicle or a semi-autonomous vehicle. As can be appreciated, the storage panel system 100 can be implemented in other non-autonomous systems and is not limited to the present embodiments. The vehicle 10 is depicted in the illustrated embodiment as a sport utility vehicle (SUV), but it should be appreciated that any other vehicle, including motorcycles, passenger cars, hatchback cars, trucks, recreational vehicles (RVs), etc., can also be used. In this example, the vehicle 10 includes the liftgate 99, which is movable or pivotable relative to the body 14 to enable access to the rear compartment 102. As will be discussed, the storage panel system 100 is coupled to the liftgate 99 to move or pivot with a corresponding movement of the liftgate 99 to provide ease of access into the rear compartment 102. In other examples, the storage panel system 100 may be fixed or may not move or pivot with a corresponding movement of the liftgate 99.

As shown, the vehicle 10 generally includes a propulsion system 24, a transmission system 26, a steering system 27, a brake system 28, a sensor system 30, an actuator system 32 and at least one controller 34. The propulsion system 24 may, in various embodiments, include an internal combustion engine, an electric machine such as a traction motor, and/or a fuel cell propulsion system. The transmission system 26 is configured to transmit power from the propulsion system 24 to the vehicle wheels 16 and 18 according to selectable speed ratios. According to various embodiments, the transmission system 26 may include a step-ratio automatic transmission, a continuously-variable transmission, or other appropriate transmission.

The brake system 28 is configured to provide braking torque to the vehicle wheels 16 and 18. Brake system 28 may, in various embodiments, include friction brakes, brake by wire, a regenerative braking system such as an electric machine, and/or other appropriate braking systems.

The steering system 27 influences a position of the vehicle wheels 16 and/or 18. While depicted as including a steering wheel for illustrative purposes, in some embodiments contemplated within the scope of the present disclosure, the steering system 27 may not include a steering wheel.

The sensor system 30 includes one or more sensing devices 40a-40n that sense observable conditions of the exterior environment and/or the interior environment of the vehicle 10. In various embodiments, the sensing devices 40a-40n include, but are not limited to, radars (e.g., long-range, medium-range-short range), lidars, global positioning systems, optical cameras (e.g., forward facing, 360-degree, rear-facing, side-facing, stereo, etc.), thermal (e.g., infrared) cameras, ultrasonic sensors, odometry sensors (e.g., encoders) and/or other sensors that might be utilized in connection with systems and methods in accordance with the present subject matter. The sensor system 30 is in communication with the controller 34 over a communication medium.

The actuator system 32 includes one or more actuator devices 42a-42n that control one or more vehicle features such as, but not limited to, the propulsion system 24, the transmission system 26, the steering system 27, and the brake system 28. In various embodiments, the vehicle 10 may also include interior and/or exterior vehicle features not illustrated in FIG. 1, such as a doors, and cabin features such as air, music, lighting, touch-screen display components, active safety seat or haptic seat, and the like.

The controller 34 includes at least one processor 44 and a computer-readable storage device or media 46. The processor 44 may be any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the controller 34, a semiconductor-based microprocessor (in the form of a microchip or chip set), any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

Figure 2:
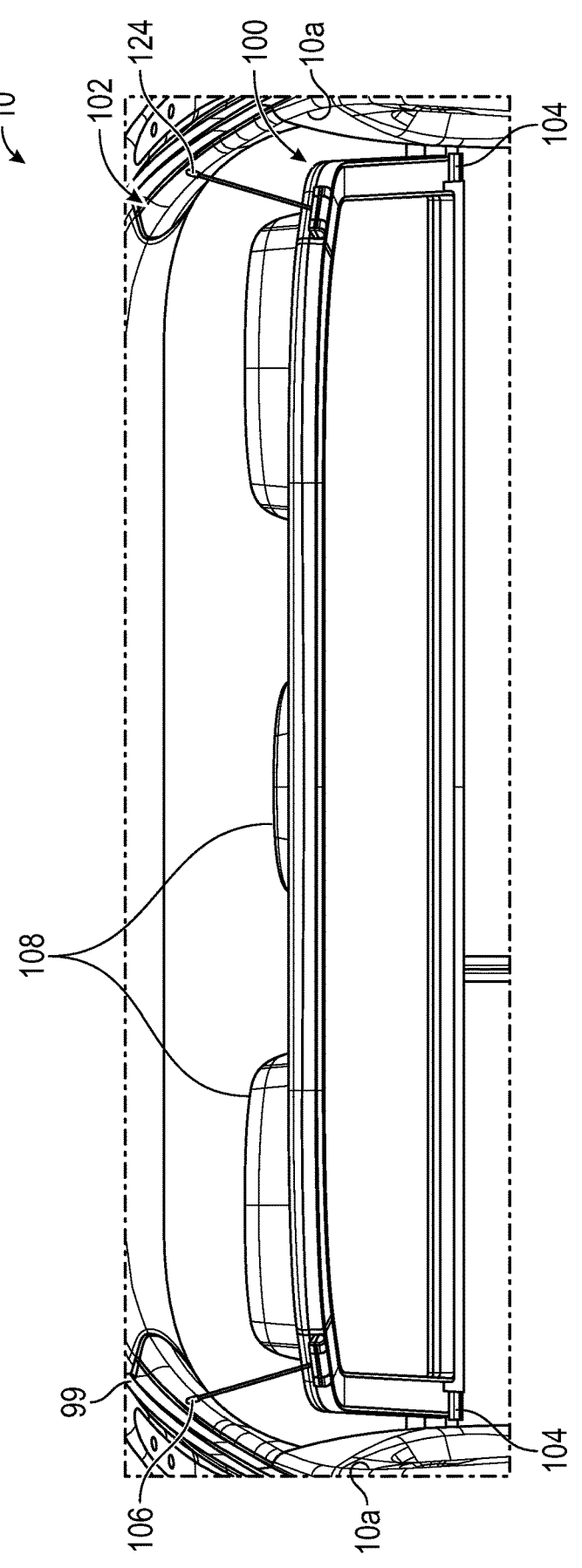
FIG. 2 is a rear perspective view of the storage panel system coupled to the rear compartment in accordance with various embodiments, in which at least one tether of the storage panel system is uncoupled from a liftgate of the vehicle and the storage panel system is in a second, opened position.
Figure 2A:
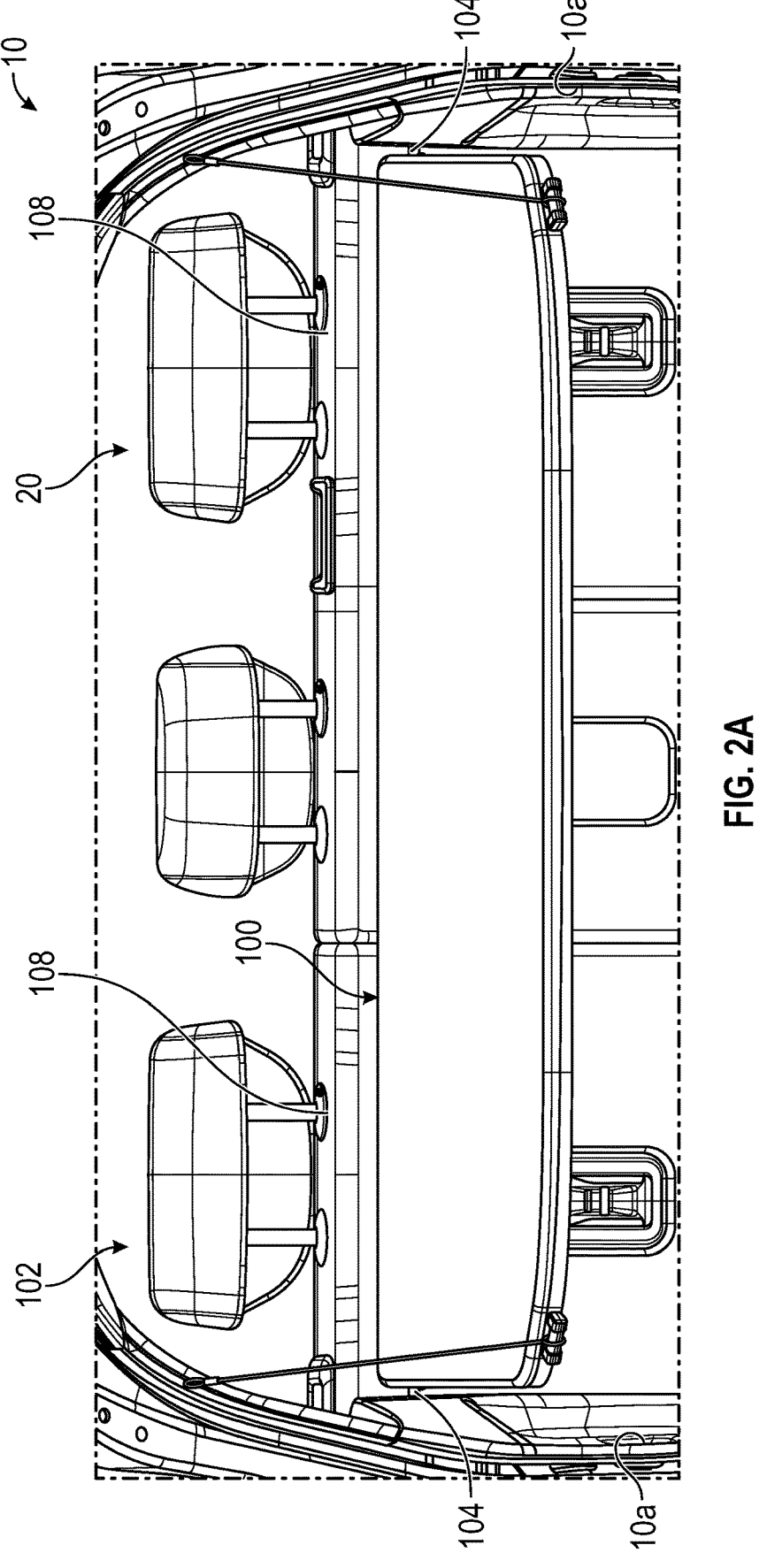
FIG. 2A is a rear perspective view of the storage panel system coupled to the rear compartment in accordance with various embodiments, in which the at least one tether of the storage panel system is uncoupled from the liftgate of the vehicle and the storage panel system is in a first, closed position.
Figure 3:
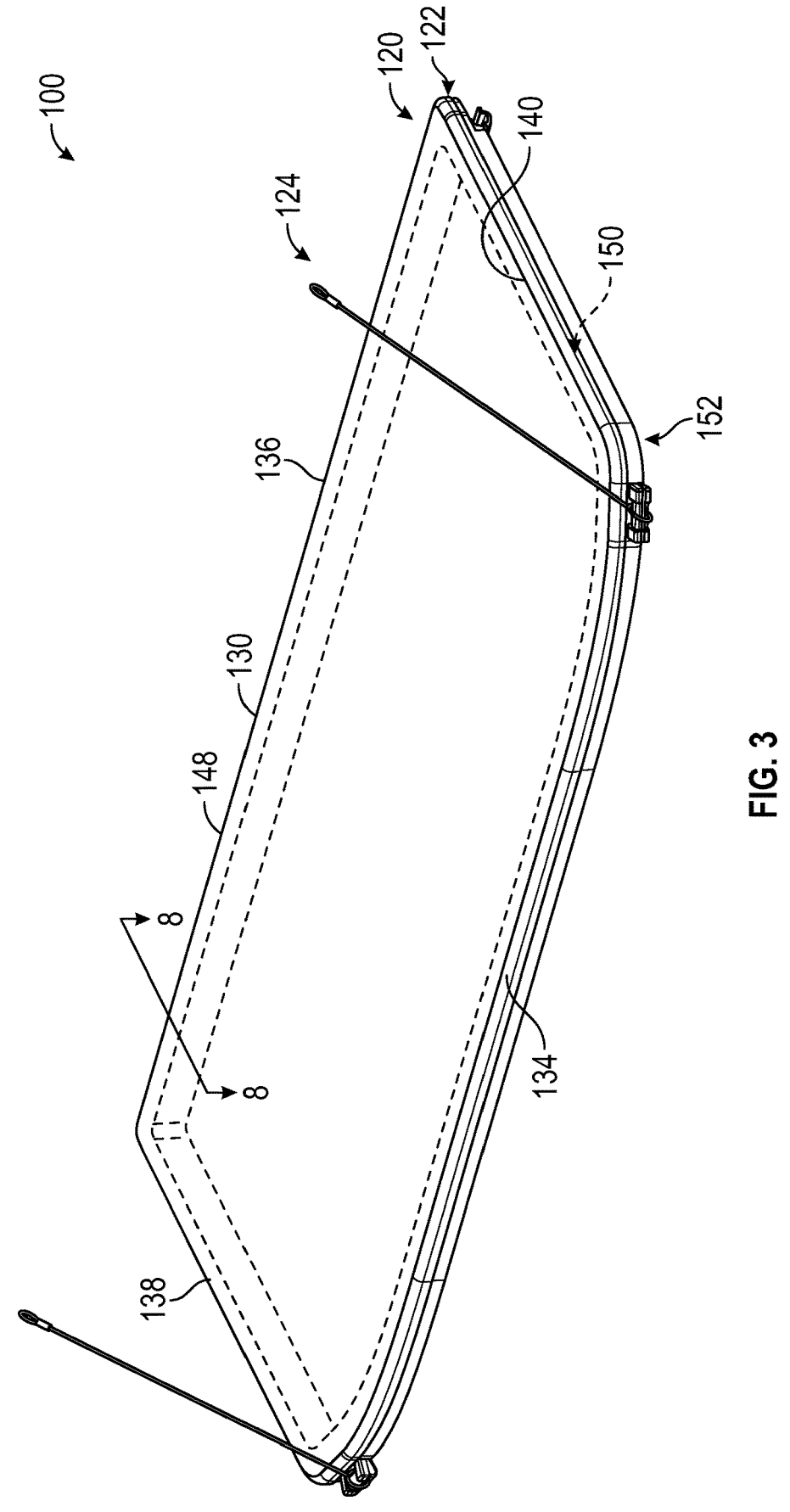
FIG. 3 is a rear perspective view of the storage panel system in accordance with various embodiments.

With reference to FIGS. 2 and 2A, the storage panel system 100 coupled to the liftgate 99 is shown in greater detail. Briefly, the liftgate 99 is movably or rotatably coupled to the vehicle 10 so as to be pivotable between at least a first, closed position (FIGS. 1 and 2A), and a second, opened position (FIG. 2). In the first, closed position, the liftgate 99 encloses the rear compartment 102, and in the second, opened position, the liftgate 99 provides access to the rear compartment 102. Generally, a pair of actuators associated with the actuator system 32 are coupled to opposed sides of the liftgate 99 and are responsive to one or more control signals from the controller 34 to move the liftgate 99 between the first, closed position and the second, opened position. In addition, the liftgate 99 may include a latch, which includes an actuator that is responsive to one or more control signals to release the liftgate 99 from the body of the vehicle 10.

In this example, the storage panel system 100 is coupled to the rear compartment 102 to be movable with a movement of the liftgate 99. In this example, with reference to FIGS. 2A and 2B, the rear compartment 102 includes at least one or a pair of pivot pins 104 and the liftgate 99 includes at least one or a pair of anchor posts 106 (FIG. 2A). The pivot pins 104 are defined on opposed sides of the rear compartment 102, and are positioned proximate a top surface of one or more rearmost seats 108 in the passenger compartment 20. The pivot pins 104 are substantially cylindrical to be received within a portion of the storage panel system 100, however, the pivot pins 104 may have any shape that cooperates with the storage panel system 100 to enable the storage panel system 100 to move or pivot with the movement of the liftgate 99. With reference to FIG. 2, the pair of anchor posts 106 comprise posts, bolts, etc. that are coupled to opposed sides of the liftgate 99 to receive a portion of the storage panel system 100 to couple the storage panel system 100 to the liftgate 99. The anchor posts 106 enable the storage panel system 100 to be coupled directly to the liftgate 99 and to move or pivot with the liftgate 99. Generally, the rear compartment 102 is defined aft of the passenger compartment 20 and is an area defined between the rearmost seats 108, interior sidewalls 10a of the vehicle 10 and the liftgate 99. The interior sidewalls 10a of the vehicle 10 define the sides of the rear compartment 102.

Figure 4:
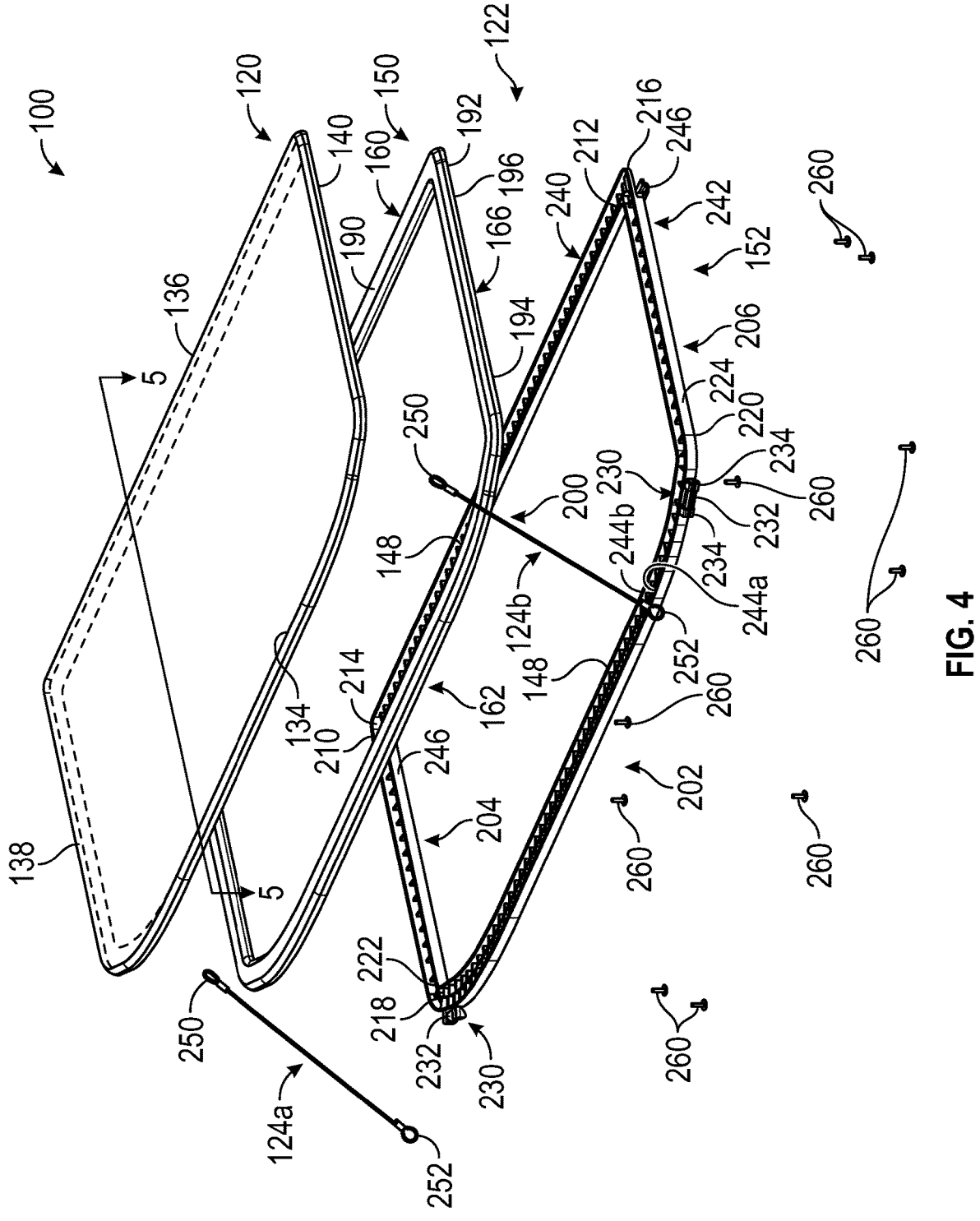
FIG. 4 is a partially exploded view of the storage panel system.
Figure 5:
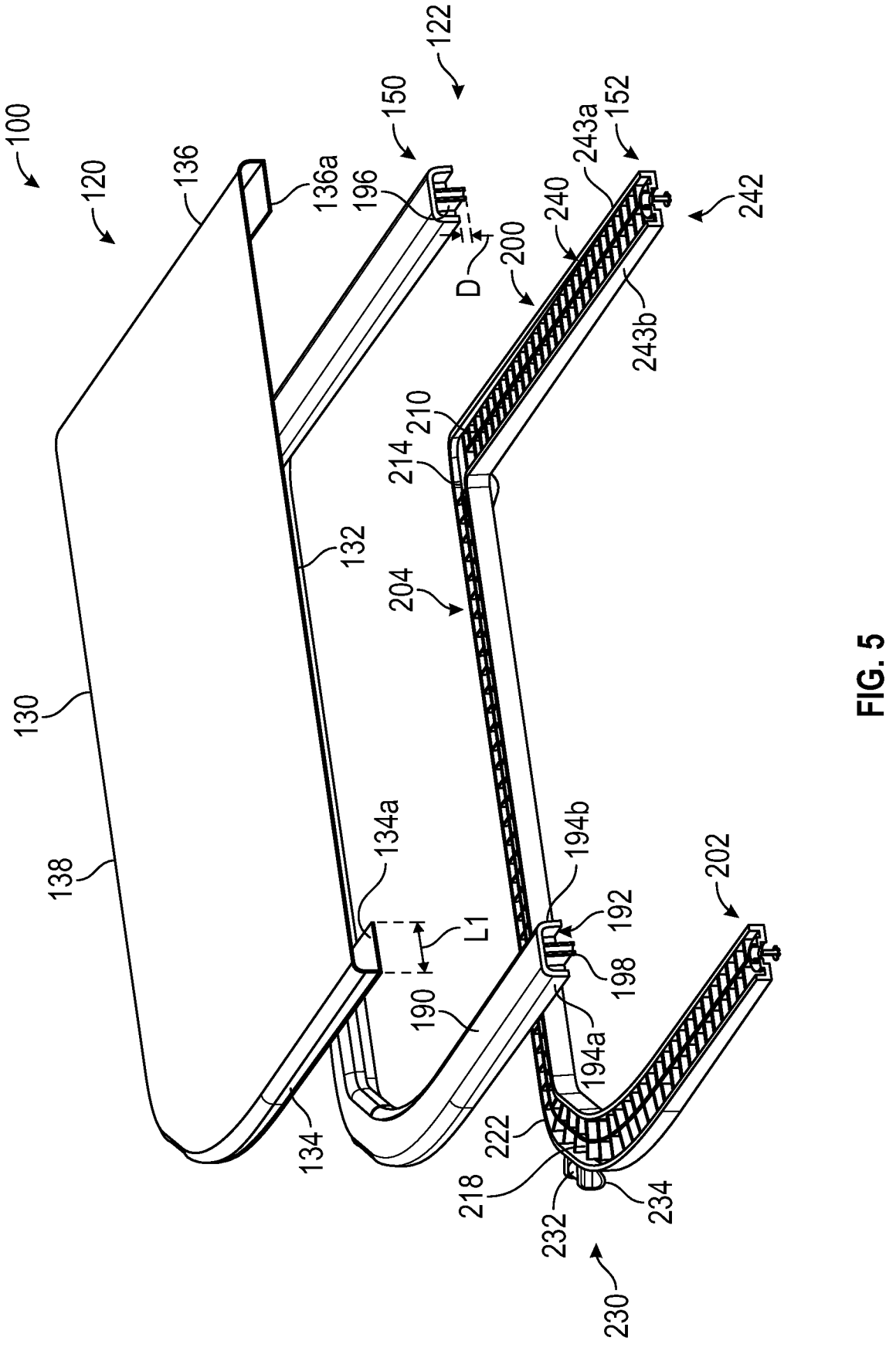
FIG. 5 is a partially exploded cross-sectional view of the storage panel system taken from line 5-5 of FIG. 4.

In one example, the storage panel system 100 includes a cover 120, a panel frame assembly 122 and at least one tether 124. In this example, the cover 120 is substantially rectangular to conform with a shape of the rear compartment 102, and is sized to cooperate with the liftgate 99 to enclose the rear compartment 102 to protect contents in the rear compartment 102 from view. It should be noted that the cover 120 may have any desired polygonal shape that conforms with the shape of the rear compartment 102. In one example, the cover 120 is composed of a textile, fabric, cloth or a material produced by weaving or knitting fibers, threads, etc., including, but not limited to polyester knit fabric. The cover 120 is a substantially planar structure. In other examples, the cover 120 may be composed of a thin plastic sheet. With additional reference to FIGS. 4 and 5, the cover 120 is substantially lightweight, which reduces a weight associated with the storage panel system 100. The cover 120 includes a first cover surface 130 (or upper surface) opposite a second cover surface 132 (FIG. 5) (or lower surface), a first cover side 134 opposite a second cover side 136 and a third cover side 138 opposite a fourth cover side 140.

The first cover surface 130 defines an exterior upper surface of the cover 120, and is viewable when the liftgate 99 is in the first, closed position. The second cover surface 132 faces the rear compartment 102, and is an interior lower surface of the cover 120. The first cover side 134 is adjacent to the liftgate 99 when the storage panel system 100 is coupled to the vehicle 10. The second cover side 136 is adjacent to the rearmost seats 108 when the storage panel system 100 is coupled to the vehicle 10. The third cover side 138 and the fourth cover side 140 interconnect the first cover side 134 and the second cover side 136, and are adjacent to sides of the rear compartment 102 and sides of the liftgate 99 when the storage panel system 100 is coupled to the vehicle 10. Generally, each of the first cover side 134, the second cover side 136, the third cover side 138 and the fourth cover side 140 are shaped to conform or correspond to the contour of the rear compartment 102 of the vehicle 10. The third cover side 138 and the fourth cover side 140 are also shaped to conform or correspond to the contour of the interior sidewalls 10*a* of the vehicle 10.

In this example, each of the first cover side 134, the second cover side 136, the third cover side 138 and the fourth cover side 140 are defined by a portion of the cover 120 being folded over or wrapped upon itself. Stated another way, with reference to FIG. 5, in this example, a portion of the cover 120 is wrapped about a portion of the panel frame assembly 122, such that each of the first cover side 134, the second cover side 136, the third cover side 138 and the fourth cover side 140 are defined by the portion of the cover 120 that extends around the portion of the panel frame assembly 122. A terminal end 134*a*, 136*a*, 138*a*, 140*a* of the respective one of the first cover side 134, the second cover side 136, the third cover side 138 and the fourth cover side 140 is positioned so as to be received within a portion of the panel frame assembly 122. Generally, the terminal end 134*a*, 136*a*, 138*a*, 140*a* extends for a length L1 inward or towards a center of the cover 120. The length L1 is predetermined to ensure that the cover 120 is coupled or secured to the panel frame assembly 122.

The panel frame assembly 122 imparts rigidity to the cover 120. This enables the cover 120 to be composed of textile, fabric, cloth, etc. without resulting in sagging or wrinkling. The panel frame assembly 122 defines a central opening 148, and includes a first frame 150 (or upper frame) and a second frame 152 (or lower frame). The cover 120 is coupled to the panel frame assembly 122 such that the terminal end 134*a*, 136*a*, 138*a*, 140*a* of the respective one of the first cover side 134, the second cover side 136, the third cover side 138 and the fourth cover side 140 is sandwiched between the first frame 150 and the second frame 152. The cover 120 spans an entirety of the central opening 148 on one side of the panel frame assembly 122.

In this example, the cover 120 spans the central opening 148 along the side of the panel frame assembly 122 defined by the first frame 150. Generally, the cover 120 spans a single side of the panel frame assembly 122 or is wrapped about the first frame 150 such that an opposite side of the panel frame assembly 122 defined by the second frame 152 is devoid of the cover 120. The second frame 152 defines a second side of the panel frame assembly 122. The first frame 150 and the second frame 152 are each composed of a polymer-based material, and may be molded, additively manufactured, etc. In one example, the first frame 150 is composed of a different polymer-based material than the second frame 152. In this example, the first frame 150 is composed of talc filled polypropylene, and the second frame 152 is composed of nylon 66. By composing the first frame 150 and the second frame 152 from a polymer-based material, the first frame 150 and the second frame 152 may be formed to conform with the shape of the rear compartment 102 and/or liftgate 99, which may include a curvature. The first frame 150 and the second frame 152 are described herein as comprising multiple frame members that are coupled together, via press-fit or snap-fit, however, it should be understood that that first frame 150 and/or the second frame 152 may be composed of a unitary or one-piece structure. Further, one or more mechanical fasteners, adhesives or other techniques may be used to couple the pieces of the first frame 150 and/or the second frame 152 together, if desired. Generally, by composing the first frame 150 and the second frame 152 with multiple frame members, the first frame 150 and the second frame 152 are robust and deformation of the first frame 150 and the second frame 152 is reduced.

Figure 6:
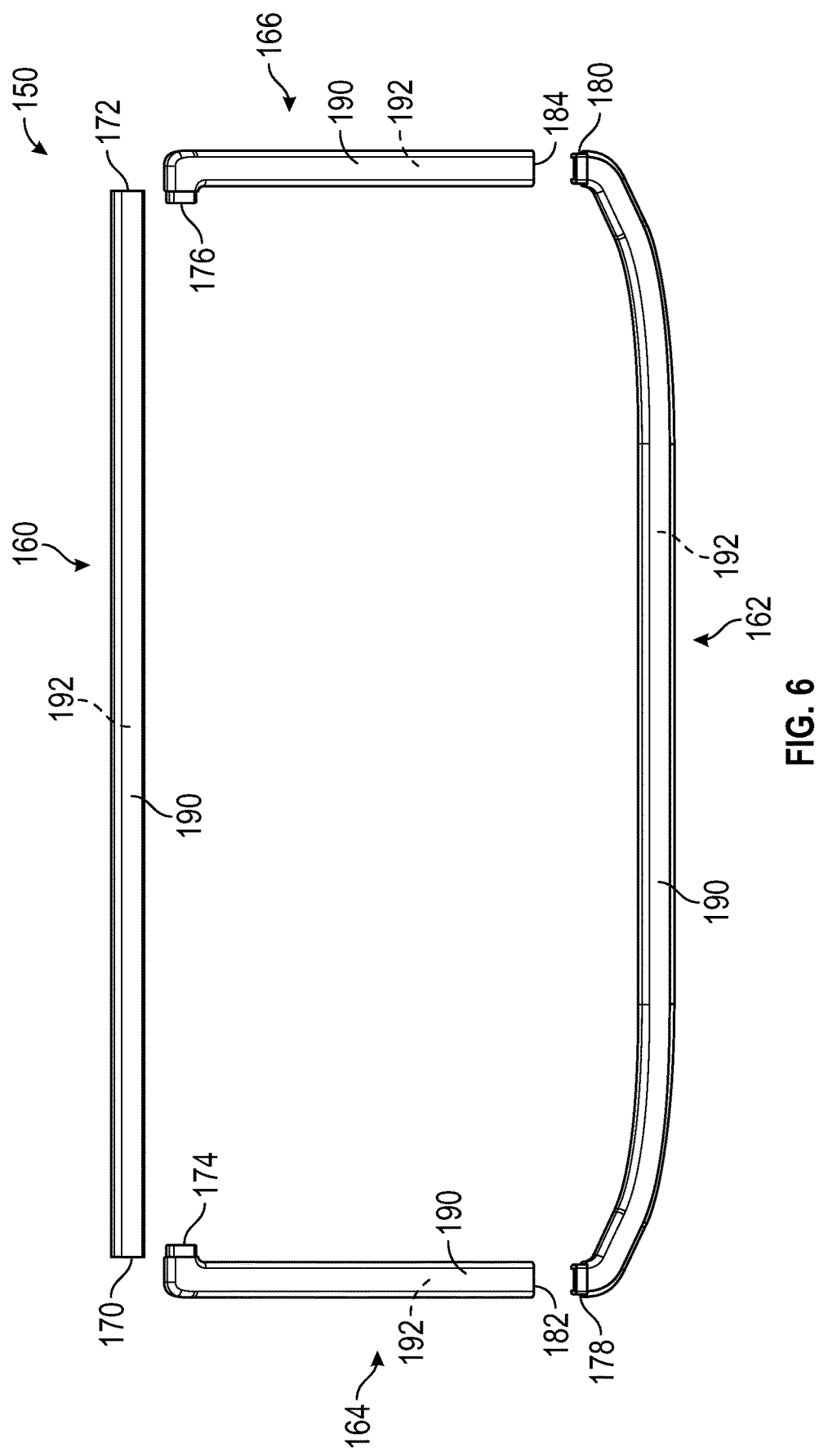
FIG. 6 is an exploded view of a first frame of the storage panel system in accordance with various embodiments, in which a first side of the first frame is shown.

With reference to FIG. 6, the first frame 150 is shown in greater detail. In this example, the first frame 150 surrounds or defines a portion of the central opening 148 and includes four members: a first frame member 160, a second frame member 162, a third frame member 164 and a fourth frame member 166. In other examples, the first frame 150 may include a greater or lesser number of frame members. The first frame member 160 includes a first end 170 and an opposite second end 172. The first frame member 160 generally reinforces the cover 120 along the second cover side 136, and the second cover side 136 is wrapped around an outer surface of the first frame member 160. In this example, the first frame member 160 is substantially straight to correspond to the shape of the rear compartment 102. The first frame member 160 is opposite the second frame member 162. The first end 170 is coupled to the third frame member 164 and the second end 172 is coupled to the fourth frame member 166. In this example, the first end 170 and the second end 172 comprise receptacles that have a shape that conforms with a first end 174, 176 of the respective one of the third frame member 164 and the fourth frame member 166. In this example, the respective first end 174, 176 of each of the third frame member 164 and the fourth frame member 166 is received within the respective one of the first end 170 and the second end 172 to couple the third frame member 164 and the fourth frame member 166 to the first frame member 160 via the press-fit or snap-fit.

The second frame member 162 includes a first end 178 and an opposite second end 180. The second frame member 162 generally reinforces the cover 120 along the first cover side 134, and the first cover side 134 is wrapped around an outer surface of the second frame member 162. In this example, the second frame member 162 is arcuate to correspond to the shape of the rear compartment 102. The first end 178 is coupled to the third frame member 164 and the second end 180 is coupled to the fourth frame member 166.

In this example, the first end 178 and the second end 180 may comprise a plug, which is shaped to be received within a second end 182, 184 of the respective one of the third frame member 164 and the fourth frame member 166. In this example, the first end 178 and the second end 180 of the second frame member 162 are received within the respective second end 182, 184 of each of the third frame member 164 and the fourth frame member 166 to couple the third frame member 164 and the fourth frame member 166 to the second frame member 162 via the press-fit or snap-fit.

The third frame member 164 includes the first end 174 and the opposite second end 182. The third frame member 164 generally reinforces the cover 120 along the third cover side 138, and the third cover side 138 is wrapped around an outer surface of the third frame member 164. In this example, the third frame member 164 is substantially straight to correspond to the shape of the sides of the rear compartment 102. The first end 174 is coupled to the first frame member 160 and the second end 182 is coupled to the second frame member 162. In this example, the first end 174 comprises a plug, which is shaped to be received within the first end 170 of the first frame member 160. The second end 182 comprises a receptacle, which is shaped to receive the first end 178 of the second frame member 162. The first end 174 couples the third frame member 164 to the first frame member 160, and the second end 182 couples the third frame member 164 to the second frame member 162.

The fourth frame member 166 includes the first end 176 and the opposite second end 184. The fourth frame member 166 generally reinforces the cover 120 along the fourth cover side 140, and the fourth cover side 140 is wrapped around an outer surface of the fourth frame member 166. In this example, the fourth frame member 166 is substantially straight to correspond to the shape of the sides of the rear compartment 102. The first end 176 is coupled to the first frame member 160 and the second end 184 is coupled to the second frame member 162. In this example, the first end 176 comprises a plug, which is shaped to be received within the first end 170 of the first frame member 160. The second end 184 comprises a receptacle, which is shaped to receive the first end 178 of the second frame member 162. The first end 176 couples the fourth frame member 166 to the first frame member 160, and the second end 184 couples the fourth frame member 166 to the second frame member 162.

Figure 6A:
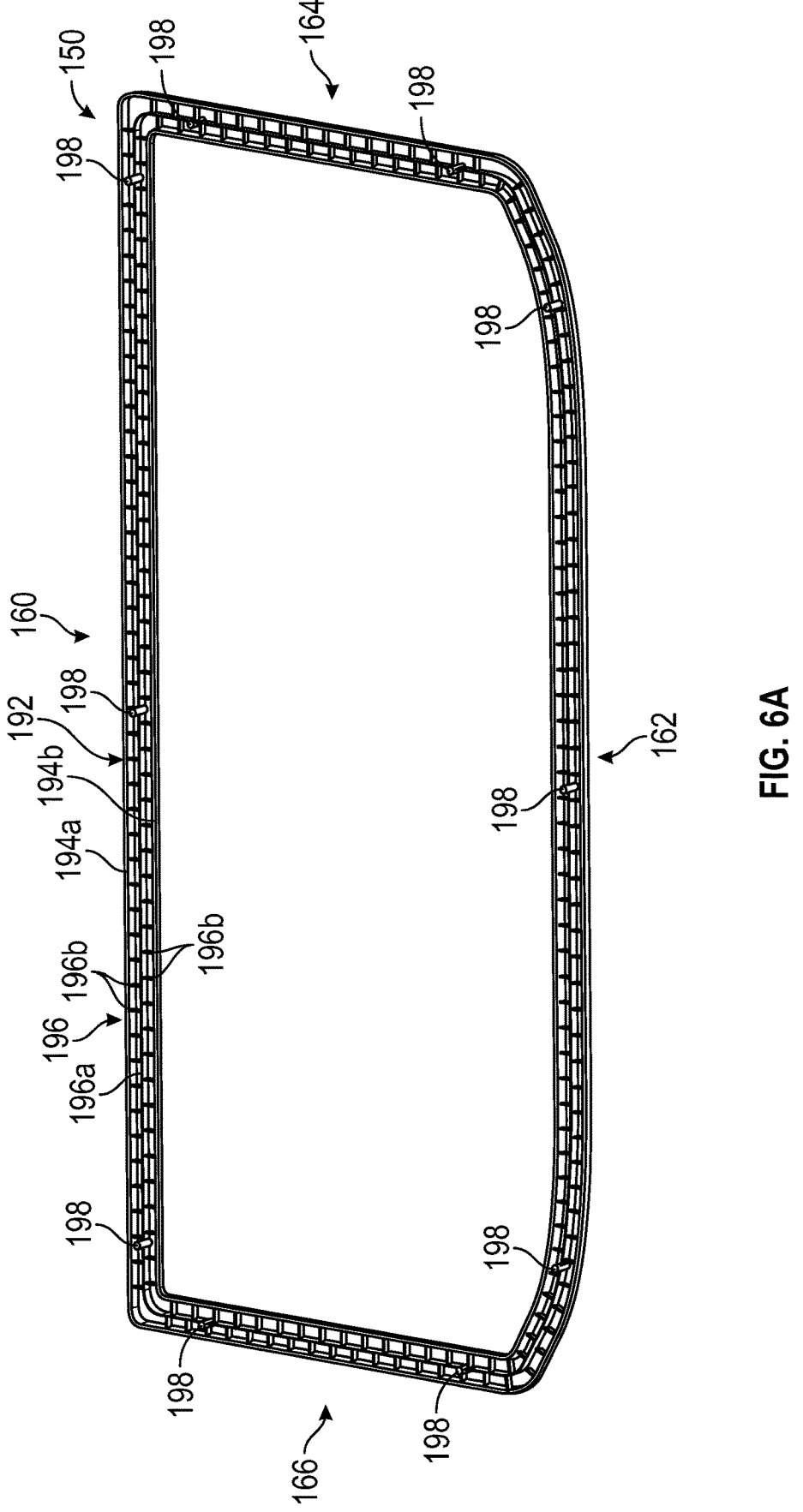
FIG. 6A is a perspective view of a second side of the first frame of the storage panel system in accordance with various embodiments.

Each of the first frame member 160, the second frame member 162, the third frame member 164 and the fourth frame member 166 also have a first side 190 opposite a second side 192. Stated another way, the first frame 150 has the first side 190 opposite the second side 192. The first side 190 is substantially smooth, and is coupled to or in contact with the second cover surface 132. With reference to FIG. 6A, the second side 192 is substantially U-shaped, and includes a pair of flanges 194, a plurality of ribs 196 and at least one or a plurality of bosses 198. The flanges 194 extend outward or radially from the second side 192 along opposed surfaces of the second side 192. The flanges 194 are coupled to the respective cover side 134, 136, 138, 140 of the cover 120. One of the flanges 194a defines an outer perimeter of the first frame 150 and the other flange 194b defines an inner perimeter of the first frame 150.

In one example, the plurality of ribs 196 includes a central rib 196a and a plurality of reinforcing ribs 196b. The central rib 196a is defined substantially evenly between the flanges 194a, 194b. The central rib 196a extends about the perimeter of the second side 192 and cooperates with the reinforcing ribs 196b to provide reinforcement for the bosses 198 and rigidity to the first frame 150. In this example, the reinforcing ribs 196b are staggered or stepped on opposed sides of the central rib 196a. Stated another way, a first subset of reinforcing ribs 196b are defined between the flange 194a and the central rib 196a, and a second subset of the reinforcing ribs 196b are defined between the flange 194b and the central rib 196a. The reinforcing ribs 196b of the first subset are offset from, misaligned with or staggered relative to the reinforcing ribs 196b of the second subset such that the reinforcing ribs 196b are offset along an axis that runs substantially perpendicular to the central rib 196a. The reinforcing ribs 196b generally extend along an axis that is substantially perpendicular to an axis defined by the central rib 196a associated with each of the first frame member 160, the second frame member 162, the third frame member 164 and the fourth frame member 166.

The bosses 198 receive a mechanical fastener 260 (FIG. 4B), such as a self-tapping screw. The bosses 198 are defined on the second side 192 about the perimeter of the first frame 150. As will be described, the bosses 198 receive the mechanical fastener 260 to further couple the first frame 150 to the second frame 152. In one example, the second side 192 includes about 10 bosses 198, however, any number of bosses 198 may be employed. Each of the first frame member 160 and the second frame member 162 also include bosses 198 within a middle or midsection of each of the first frame member 160 and the second frame member 162 to provide stiffness for the respective elongated first frame member 160 and the second frame member 162.

Figure 7:
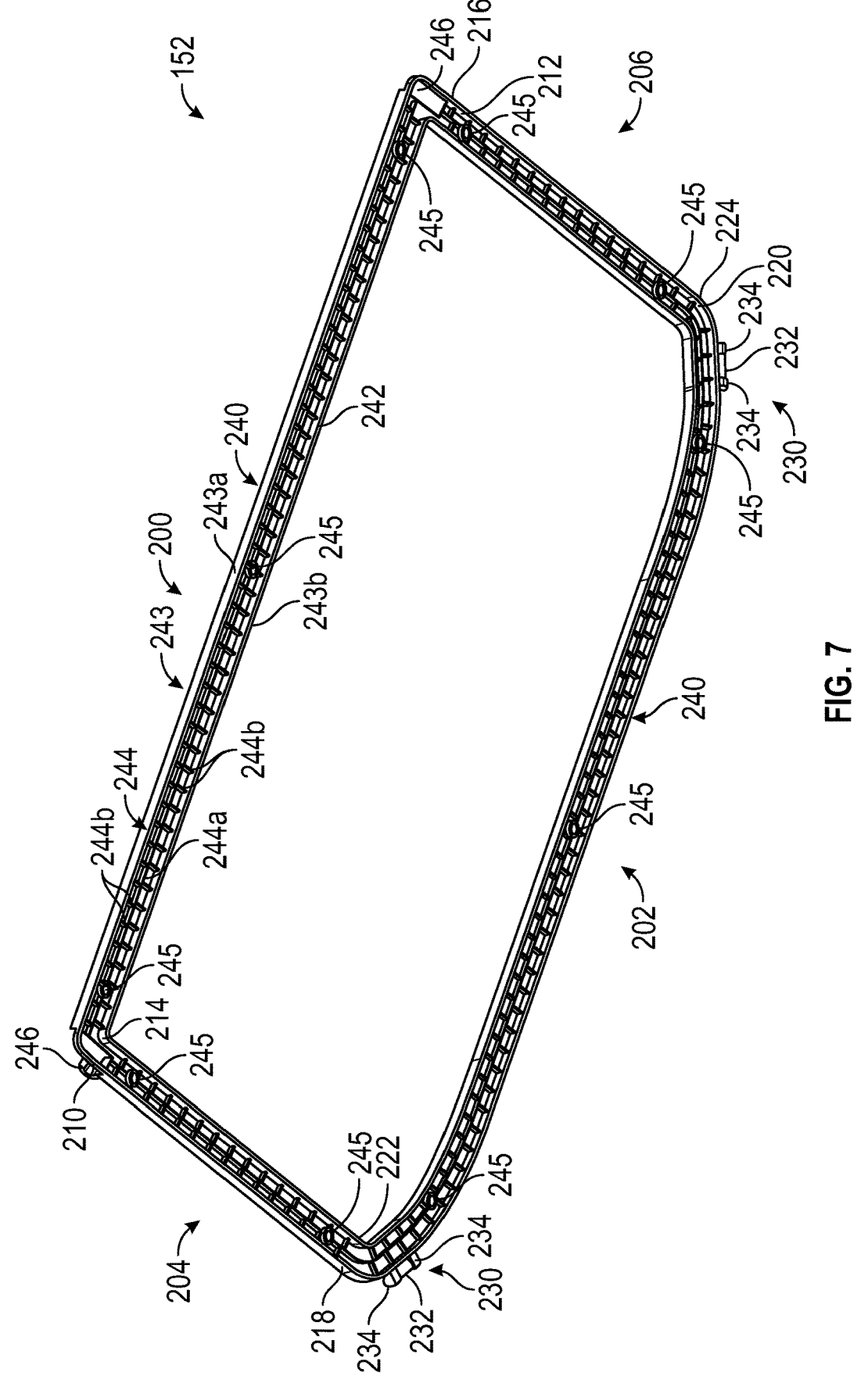
FIG. 7 is a perspective view of a first side of a second frame of the storage panel system in accordance with various embodiments.
Figure 7A:
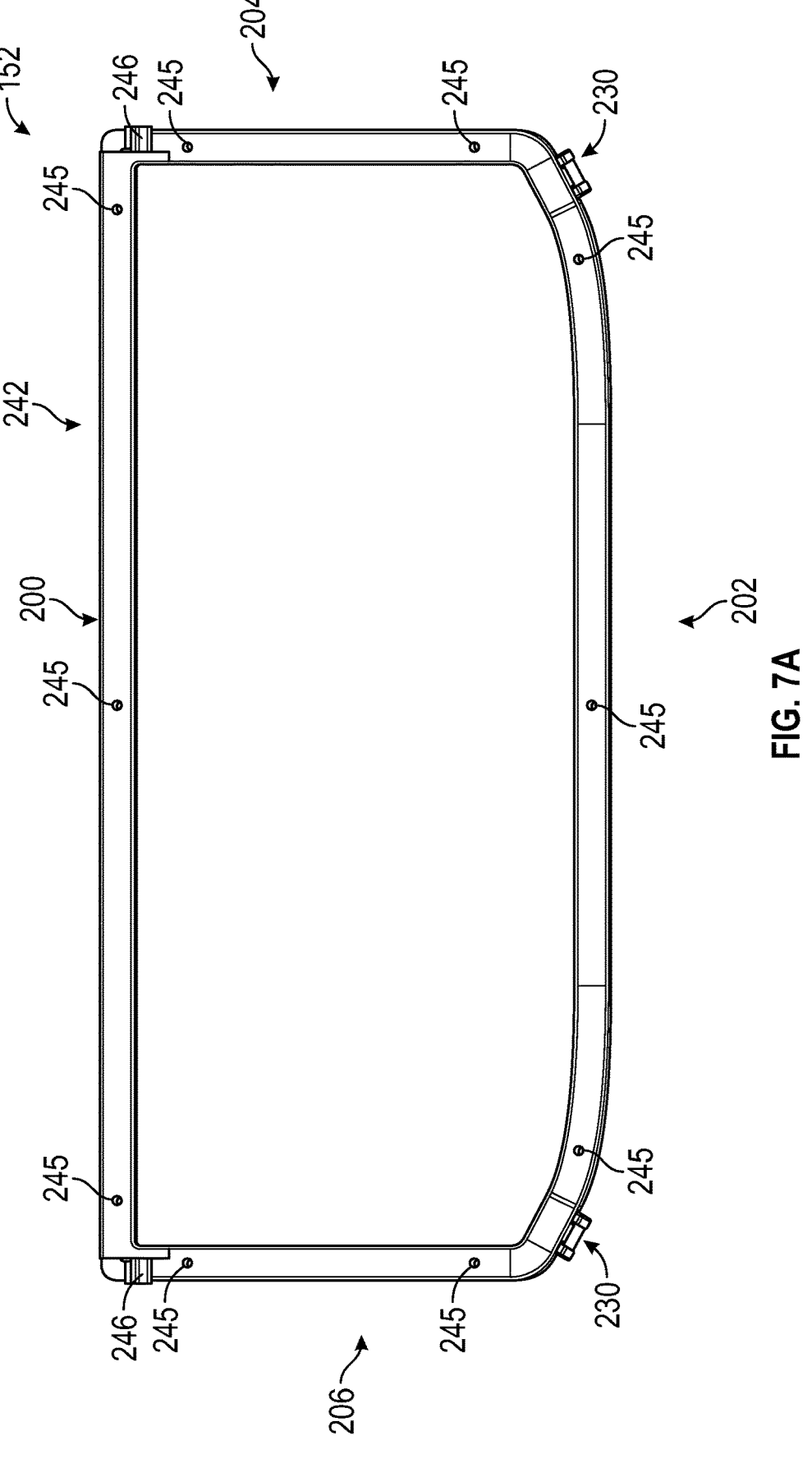
FIG. 7A is a perspective view of a second side of the second frame of the storage panel system in accordance with various embodiments.

With reference to FIGS. 7 and 7A, in one example, the second frame 152 surrounds or defines a portion of the central opening 148 and includes four members: a fifth frame member 200, a sixth frame member 202, a seventh frame member 204 and an eighth frame member 206. In other examples, the second frame 152 may include a greater or lesser number of frame members. The fifth frame member 200 includes a first end 210 and an opposite second end 212. The fifth frame member 200 generally reinforces the cover 120 along the second cover side 136, and the fifth frame member 200 is coupled to the first frame member 160 such that the second cover side 136 is sandwiched between the fifth frame member 200 and the first frame member 160. In this example, the fifth frame member 200 is substantially straight to correspond to the shape of the rear compartment 102. The fifth frame member 200 is opposite the sixth frame member 202. The first end 210 is coupled to the seventh frame member 204 and the second end 212 is coupled to the eighth frame member 206. In this example, the first end 210 and the second end 212 comprise receptacles that have a shape that conforms with a first end 214, 216 of the respective one of the seventh frame member 204 and the eighth frame member 206. In this example, the respective first end 214, 216 of each of the seventh frame member 204 and the eighth frame member 206 are received within the respective one of the first end 210 and the second end 212 to couple the seventh frame member 204 and the eighth frame member 206 to the fifth frame member 200 via the press-fit or snap-fit.

The sixth frame member 202 includes a first end 218 and an opposite second end 220. The sixth frame member 202 generally reinforces the cover 120 along the first cover side 134, and the sixth frame member 202 is coupled to the second frame member 162 such that the first cover side 134 is sandwiched between the sixth frame member 202 and the second frame member 162. In this example, the sixth frame member 202 is arcuate to correspond to the shape of the rear compartment 102. The first end 218 is coupled to the seventh frame member 204 and the second end 220 is coupled to the eighth frame member 206. In this example, the first end 218 and the second end 220 may comprise a plug, which is shaped to be received within a second end 222, 224 of the respective one of the seventh frame member 204 and the eighth frame member 206. In this example, the first end 218 and the second end 220 of the sixth frame member 202 are received within the respective second end 222, 224 of each of the seventh frame member 204 and the eighth frame member 206 to couple the seventh frame member 204 and the eighth frame member 206 to the sixth frame member 202 via the press-fit or snap-fit.

In one example, the sixth frame member 202 includes a pair of tether anchors 230. One of the tether anchors 230 is defined adjacent to or at the first end 218, and the other of the tether anchors 230 is defined adjacent to or at the second end 220. The tether anchors 230 extend outward from an exterior surface of the sixth frame member 202. Generally, the tether anchors 230 are defined along the sixth frame member 202 to enable the at least one tether 124 to interconnect the storage panel system 100 with the liftgate 99. In this example, each of the tether anchors 230 comprise posts 232, which are spaced apart from the sixth frame member 202 by a pair of legs 234. It should be noted that the tether anchors 230 may be configured differently to couple the at least one tether 124 to the storage panel system 100. The posts 232 are substantially cylindrical, and the legs 234 have a length that spaces the respective posts 232 apart from the sixth frame member 202 to enable the at least one tether 124 to be coupled about the respective post 232.

The seventh frame member 204 includes the first end 214 and the opposite second end 222. The seventh frame member 204 generally reinforces the cover 120 along the third cover side 138, and the seventh frame member 204 is coupled to the third frame member 164 such that the third cover side 138 is sandwiched between the seventh frame member 204 and the third frame member 164. In this example, the seventh frame member 204 is substantially straight to correspond to the shape of the sides of the rear compartment 102. The first end 214 is coupled to the fifth frame member 200 and the second end 222 is coupled to the sixth frame member 202. In this example, the first end 214 comprises a plug, which is shaped to be received within the first end 210 of the fifth frame member 200. The second end 222 comprises a receptacle, which is shaped to receive the first end 218 of the sixth frame member 202. The first end 214 couples the seventh frame member 204 to the fifth frame member 200, and the second end 222 couples the seventh frame member 204 to the sixth frame member 202.

The eighth frame member 206 includes the first end 216 and the opposite second end 224. The eighth frame member 206 generally reinforces the cover 120 along the fourth cover side 140, and the eighth frame member 206 is coupled to the fourth frame member 166 such that the fourth cover side 140 is sandwiched between the eighth frame member 206 and the fourth frame member 166. In this example, the eighth frame member 206 is substantially straight to correspond to the shape of the sides of the rear compartment 102. The first end 216 is coupled to the fifth frame member 200 and the second end 224 is coupled to the sixth frame member 202. In this example, the first end 216 comprises a plug, which is shaped to be received within the first end 210 of the fifth frame member 200. The second end 224 comprises a receptacle, which is shaped to receive the first end 218 of the sixth frame member 202. The first end 216 couples the eighth frame member 206 to the fifth frame member 200, and the second end 224 couples the eighth frame member 206 to the sixth frame member 202.

Each of the fifth frame member 200, the sixth frame member 202, the seventh frame member 204 and the eighth frame member 206 also have a first side 240 (or a third side) opposite a second side 242 (or a fourth side). Stated another way, the second frame 152 has the first side 240 opposite the second side 242. The first side 240 is substantially U-shaped, and includes a pair of second flanges 243, a plurality of second ribs 244 and at least one or a plurality of fastener bores 245. The second flanges 243 extend outward or radially from the first side 240 along opposed surfaces of the first side 240. The second flanges 243 are coupled to the respective cover side 134, 136, 138, 140 of the cover 120. One of the second flanges 243a defines an outer perimeter of the second frame 152 and the other second flange 243b defines an inner perimeter of the second frame 152.

In one example, the plurality of second ribs 244 includes a second central rib 244a and a plurality of second reinforcing ribs 244b. The second central rib 244a is defined substantially evenly between the second flanges 243a, 243b. The second central rib 244a extends about the perimeter of the first side 240 and cooperates with the second reinforcing ribs 244b to provide reinforcement for the fastener bores 245 and rigidity to the second frame 152. In this example, the second reinforcing ribs 244b are staggered or stepped on opposed sides of the second central rib 244a. Stated another way, a first subset of second reinforcing ribs 244b are defined between the second flange 243a and the second central rib 244a, and a second subset of the second reinforcing ribs 244b are defined between the second flange 243b and the second central rib 244a. The second reinforcing ribs 244b of the first subset are offset from, misaligned with or staggered relative to the second reinforcing ribs 244b of the second subset such that the second reinforcing ribs 244b are offset along an axis that runs substantially perpendicular to the second central rib 244a. The second reinforcing ribs 244b generally extend along an axis that is substantially perpendicular to an axis defined by the second central rib 244a associated with each of the fifth frame member 200, the sixth frame member 202, the seventh frame member 204 and the eighth frame member 206.

Each of the fastener bores 245 are coaxially aligned with a respective boss 198 to receive the mechanical fastener 260 (FIG. 4B) to couple the first frame 150 to the second frame 152. The fastener bores 245 are defined on the first side 240 about the perimeter of the second frame 152 and extend through the first side 240 to the second side 242 (FIG. 7A). In one example, the first side 240 includes about 10 fastener bores 245, however, any number of fastener bores 245 may be employed that correspond to the bosses 198 of the first frame 150. In this example, the fastener bores 245 are defined proximate pivot receptacles 246 and the tether anchors 230 to enable the mechanical fastener 260 to provide reinforcement for the movement of the storage panel system 100. Each of the fifth frame member 200 and the sixth frame member 202 also include fastener bores 245 within a middle or midsection of each of the fifth frame member 200 and the sixth frame member 202 to enable the mechanical fastener 260 to provide stiffness for the respective elongated fifth frame member 200 and the sixth frame member 202. In one example, with reference to FIG. 8A, each of the fastener bores 245 includes a counterbore portion 245a and a cylindrical portion 245b. The counterbore portion 245a is defined through the second side 242, and receives a head of the mechanical fastener 260. The cylindrical portion 245b extends axially from the counterbore portion 245a and is sized to receive and surround a portion of the respective boss 198 when the first frame 150 is coupled to the second frame 152.

Figure 4A:
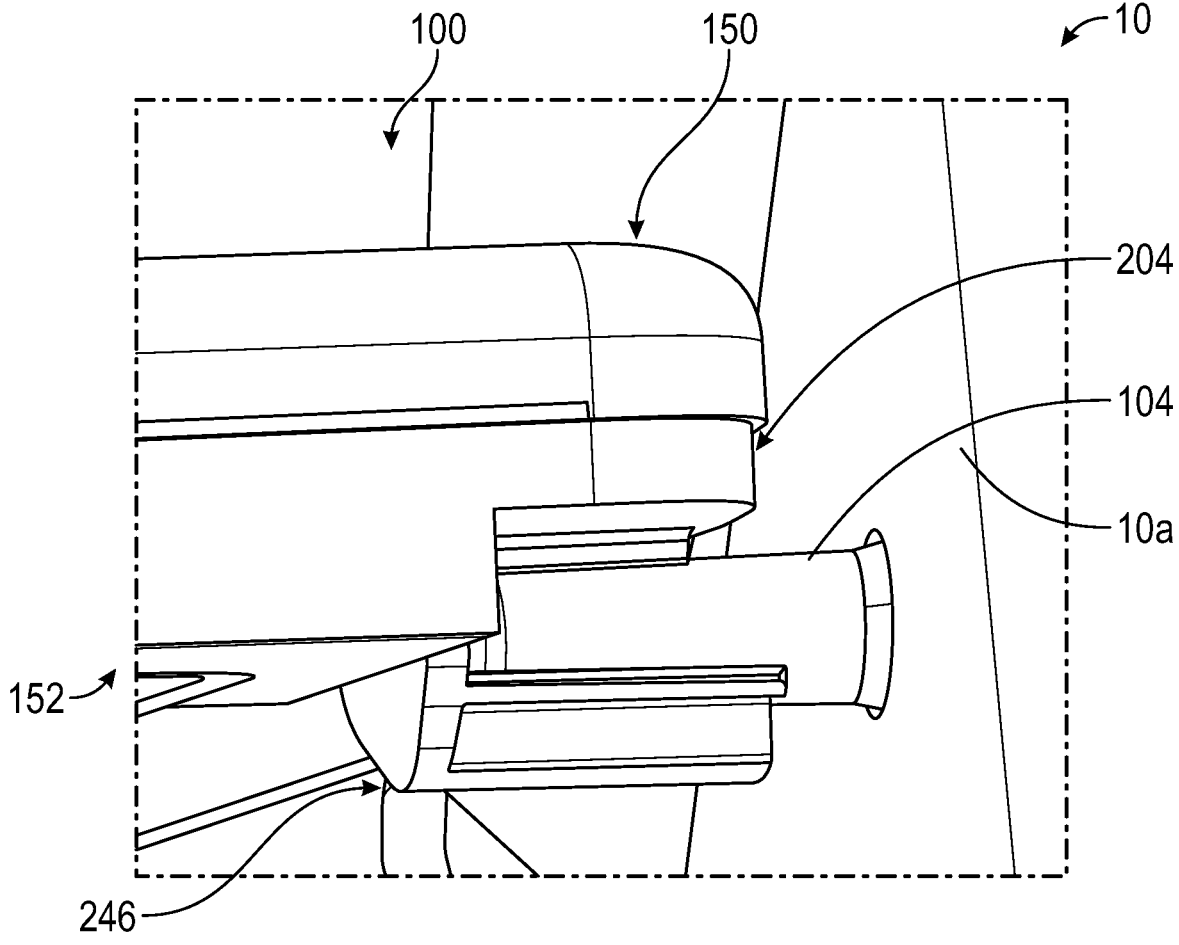
FIG. 4A is a detail view of a pivot receptacle associated with the storage panel system coupled to a pivot pin associated with the rear compartment of the vehicle.
Figure 4B:
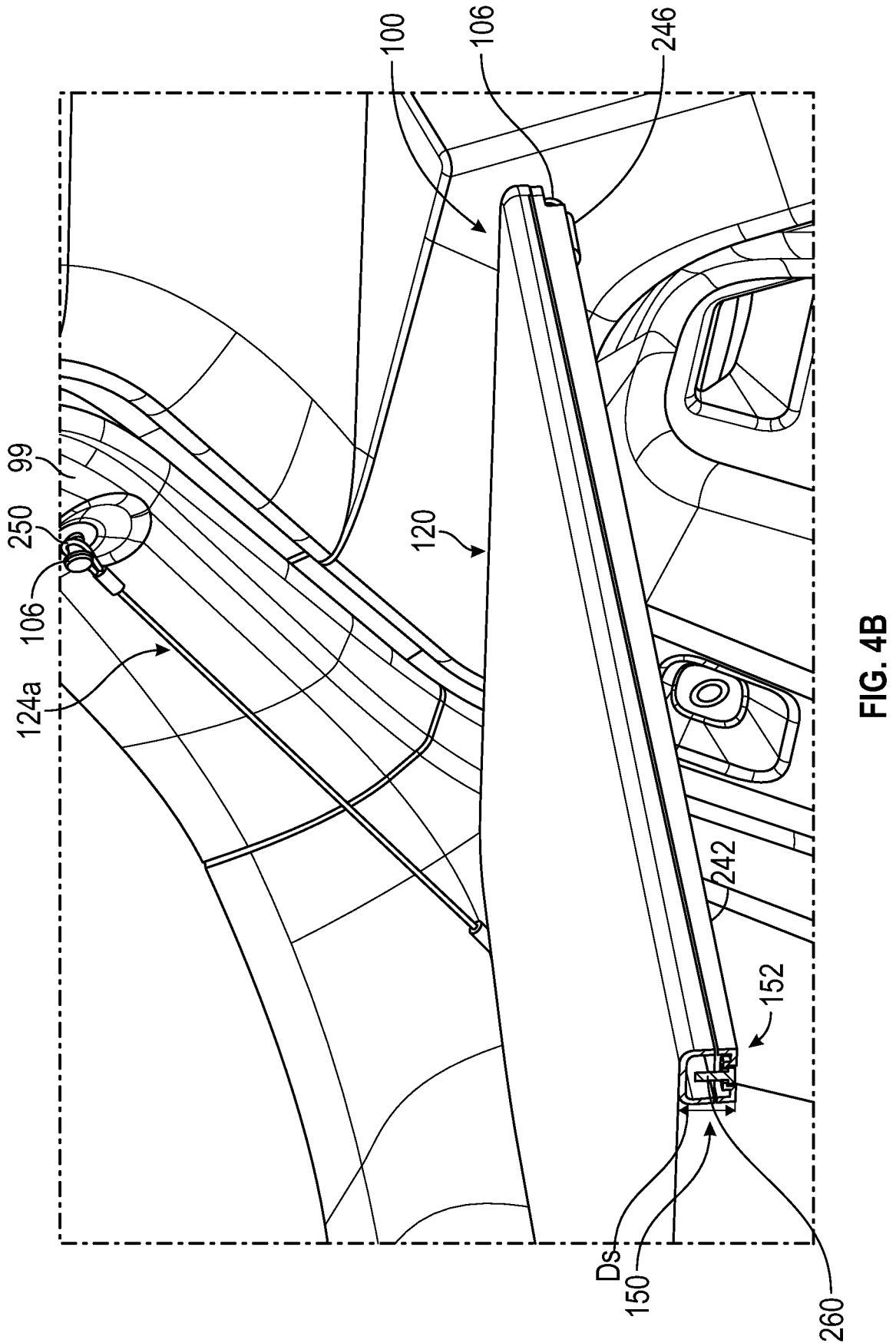
FIG. 4B is a detail partial cross-sectional view of a portion of the storage panel system, which illustrates the storage panel system coupled to the liftgate of the vehicle.

The second side 242 is substantially smooth. In this example, with reference to FIG. 7A, the second side 242 of each of the seventh frame member 204 and the eighth frame member 206 also defines a respective one of the pivot receptacles 246. Each pivot receptacle 246 is substantially C-shaped, and extends slightly outward from the second side 242. With reference to FIG. 4A, each of the pivot receptacles 246 receive a respective one of the pivot pins 104 to pivotally couple the storage panel system 100 to the rear compartment 102. Generally, each of the pivot receptacles 246 is defined so as to be substantially opposite a respective one of the tether anchors 230.

Figure 4C:
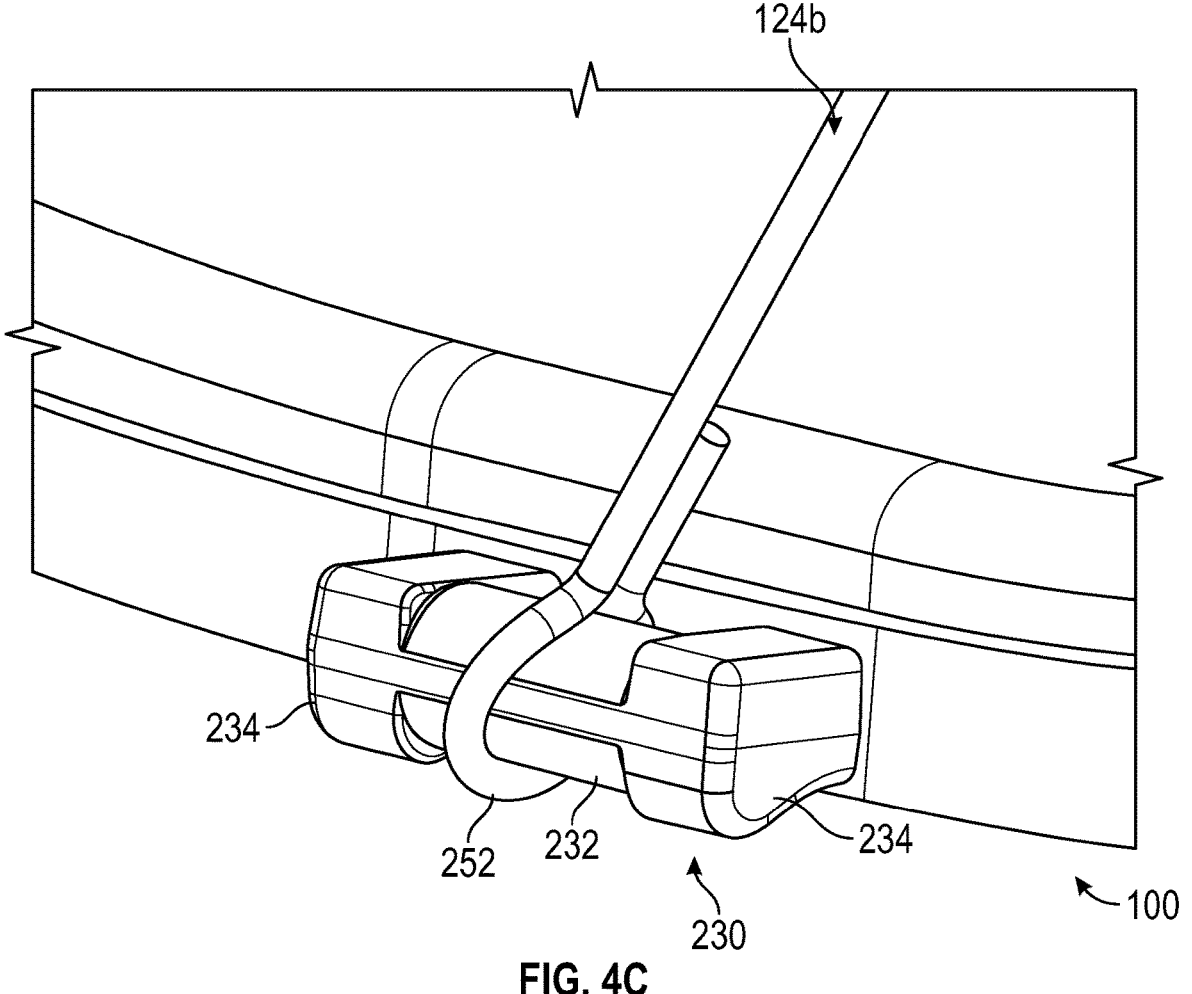
FIG. 4C is a detail perspective view of the at least one tether coupled to at least one tether anchor of the storage panel system.

With reference back to FIG. 4, the at least one tether 124 comprises two tethers 124a, 124b. Each of the tethers 124a, 124b is composed of a polymer-based material, a textile, or the like, and includes a first loop 250 at a first end and a second loop 252 at an opposite second end. The first loop 250 and the second loop 252 are separated by a length, which is predetermined to enable the storage panel system 100 to be substantially planar when the liftgate 99 is in the first, closed position (FIG. 2A). In one example, with reference to FIG. 4B, the first loop 250 of the tether 124a is coupled to the liftgate 99, and with additional reference to FIG. 4C, the second loop 252 of the tether 124a is coupled to the post 232 of the tether anchor 230 proximate the first end 218 of the sixth frame member 202. The first loop 250 of the tether 124b is coupled to the liftgate 99, and the second loop 252 of the tether 124b is coupled to the post 232 of the tether anchor 230 proximate the second end 220 of the sixth frame member 202.

In one example, in order to assemble the storage panel system 100, with reference to FIGS. 4-7A, with the first frame member 160, the second frame member 162, the third frame member 164 and the fourth frame member 166 formed, the third frame member 164 and the fourth frame member 166 are coupled to each of the first frame member 160 and the second frame member 162 to form the first frame 150. The cover sides 134, 136, 138, 140 of the cover 120 are wrapped around the first frame 150. With the fifth frame member 200, the sixth frame member 202, the seventh frame member 204 and the eighth frame member 206 formed, the seventh frame member 204 and the eighth frame member 206 are coupled to each of the fifth frame member 200 and the sixth frame member 202 to form the second frame 152. The second frame 152 is coupled to the first frame 150 such that the cover 120 is sandwiched between the first frame 150 and the second frame 152 and the cover 120 spans the central opening 148 defined by the panel frame assembly 122 along the first side 190 of the first frame 150. Generally, there is a distance Ds (FIG. 4B) defined between the cover 120 (the second cover side 136) and the second side 242 of the second frame 152 about the perimeter of the central opening 148. The second side 242 of the second frame 152 is generally a lower boundary of the central opening 148. In this example, there are no structures, supports or reinforcements within the central opening 148 such that the central opening 148 is devoid of supports or reinforcements within the distance Ds. Stated another way, a voided region or air gap is defined between the second cover side 136 and a lower boundary defined by the second side 242 of the second frame 152 about the perimeter of the central opening 148. This voided region defined between the second cover side 136 of the cover 120 and lower boundary defined by the second side 242 of the second frame 152 is devoid of structural members. Thus, generally, the central opening 148 is a void, which is surrounded by the first frame 150 and the second frame 152, and enclosed on one end by the cover 120. This voided region or void reduces a weight associated with the storage panel system 100.

Figures 8, 8A:
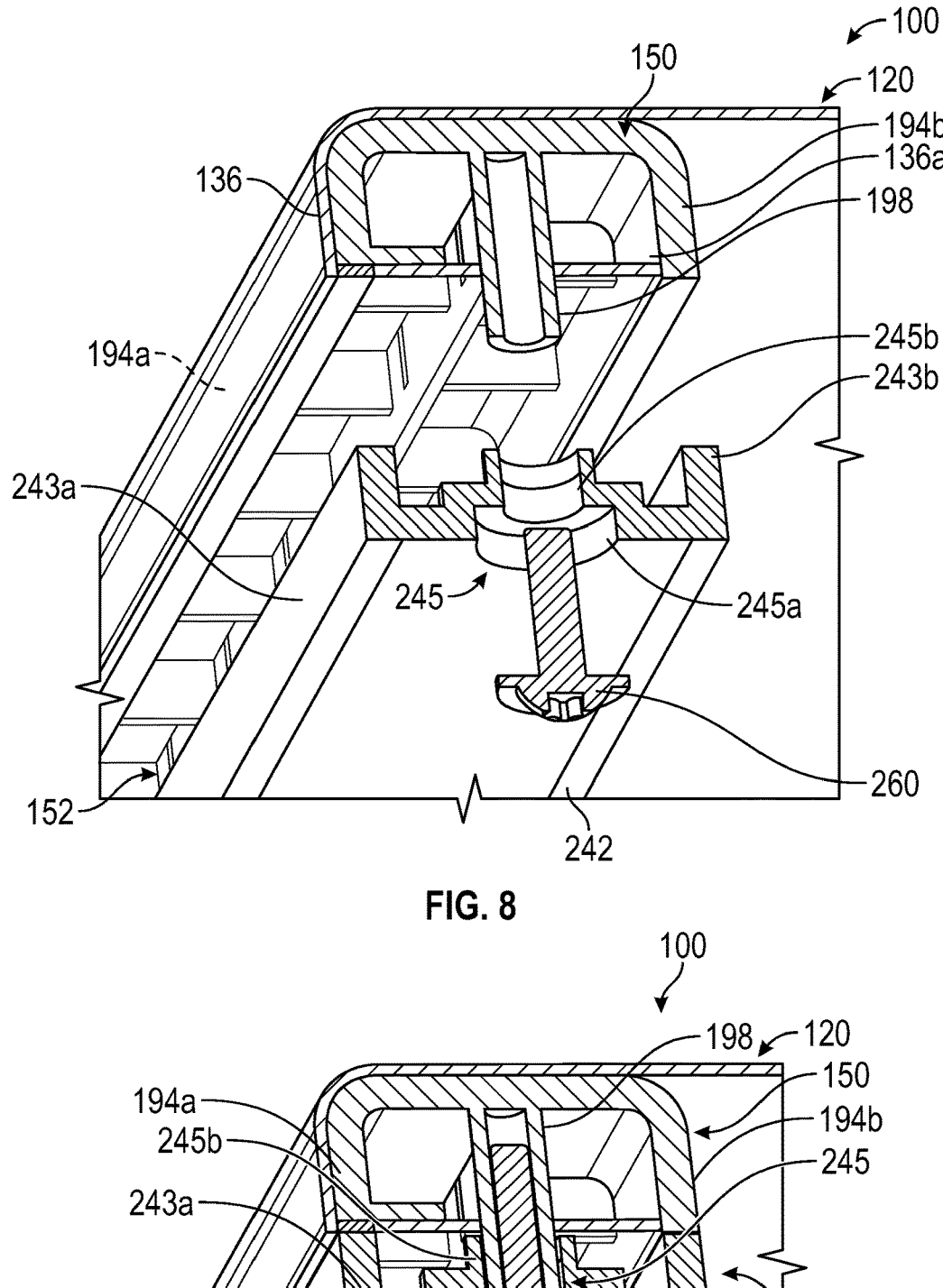
FIG. 8 is a cross-sectional partially exploded view of the first frame, the second frame and the cover, taken from the perspective of line 8-8 of FIG. 3, which illustrates a mechanical fastener that is received within the first frame and the second frame.
FIG. 8A is a cross-sectional view of the first frame, the second frame and the cover, taken along line 8-8 of FIG. 3.

With reference to FIG. 8, the second frame 152 is coupled to the first frame 150 such that each of the bosses 198 are coaxially aligned with the fastener bores 245 and the first frame 150 overlies the second frame 152. The mechanical fasteners 260 are each coaxially aligned with the fastener bores 245. With reference to FIG. 8A, each of the mechanical fasteners 260 are inserted through the respective fastener bore 245 of the second frame 152, through the cover 120 and into the respective boss 198 of the first frame 150 to couple the first frame 150 to the second frame 152. It should be noted that additional mechanical fasteners 260 may be used, or that other techniques may be employed, including, but not limited to adhesives, ultrasonic welding, etc. The coupling of the mechanical fasteners 260 to the first frame 150 may also apply tension to the cover 120 and assist in compressing the cover 120 as the cover 120 is sandwiched between the first frame 150 and the second frame 152, which reduces sagging of the cover 120.

With the first frame 150 coupled to the second frame 152 and the cover 120 compressed between the first frame 150 and the second frame 152, the cover 120 and the panel frame assembly 122 may be positioned within the rear compartment 102 such that the pivot receptacles 246 receive the pivot pins 104. The second loops 252 of the tethers 124a, 124b are coupled to the posts 232 of the tether anchors 230, and the first loops 250 are coupled to the anchor posts 106 of the liftgate 99 to couple the storage panel system 100 to the liftgate 99.

With the storage panel system 100 coupled to the liftgate 99, as the liftgate 99 moves between the first, closed position and the second, opened position, the storage panel system 100 moves or pivots with the liftgate 99. In the first, closed position, the storage panel system 100 substantially encloses the rear compartment 102 to protect items in the rear compartment 102 from view. In the second, opened position, the storage panel system 100 provides increased access to the rear compartment 102. By incorporating the panel frame assembly 122 composed of a polymer-based material, the panel frame assembly 122 reduces a weight associated with the storage panel system 100 while providing rigidity to the cover 120 and inhibiting the storage panel system 100 from generating noise during operation of the vehicle 10. In addition, by wrapping the cover sides 134, 136, 138, 140 of the cover 120 about the first frame 150, the first frame 150 assists in reducing or inhibiting sagging or wrinkling of the cover 120. Further, by composing the panel frame assembly 122 of the polymer-based materials, the tether anchors 230 and the pivot receptacles 246 may be integrally formed with the panel frame assembly 122. In addition, the use of polymer-based materials for the panel frame assembly 122 enable the first frame 150 and the second frame 152 to be shaped to match the contour or shape of the rear compartment 102, which ensures that the storage panel system 100 substantially fully encloses or covers the rear compartment 102.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A storage panel system for a rear compartment of a vehicle, a cover; and a panel frame assembly configured to be rotatably coupled to the rear compartment, wherein the panel frame assembly defines a central opening and includes a first frame that overlies a second frame, and at least a portion of the cover is sandwiched between the first frame and the second frame such that a remainder of the cover spans the central opening; and wherein the portion of the cover is wrapped around the first frame and the remainder of the cover overlies the first frame.

2. The storage panel system of claim 1, wherein the cover is composed of a textile, and the first frame and the second frame are composed of a polymer-based material.

3. The storage panel system of claim 1, wherein the first frame includes a first side opposite a second side, the portion of the cover is wrapped around the first side such that at least one terminal end of the cover is sandwiched between the second side of the first frame and the second frame.

4. The storage panel system of claim 3, wherein the second side of the first frame includes a pair of flanges and a plurality of first ribs that include a central rib and a plurality of reinforcing ribs that are misaligned relative to the central rib, and the plurality of reinforcing ribs interconnect the pair of flanges to the central rib.

5. The storage panel system of claim 3, wherein the second side of the first frame includes a boss, a third side of the second frame that faces the second side of the first frame includes a fastener bore, the fastener bore at least partially receives the boss and a mechanical fastener is coupled to the fastener bore and the boss.

6. The storage panel system of claim 1, further comprising at least one tether, wherein the second frame includes at least one tether anchor and at least one pivot receptacle defined substantially opposite the at least one tether anchor, the at least one tether anchor receives the at least one tether to couple the at least one tether to the panel frame assembly and the at least one pivot receptacle is configured to receive a pivot pin associated with the rear compartment to movably couple the storage panel system to the rear compartment.

7. The storage panel system of claim 6, wherein the second frame comprises a plurality of second frame members, and the at least one pivot receptacle is defined on one of the plurality of second frame members and the at least one tether anchor is defined on another one of the plurality of second frame members.

8. The storage panel system of claim 1, wherein a region defined between an interior side of the cover and a boundary defined by a fourth side of the second frame is devoid of structural members.

9. A vehicle, comprising:

a cabin defining a passenger compartment and a rear compartment aft of the passenger compartment, the rear compartment including at least one pivot pin; and a storage panel system to cover a portion of the rear compartment, the storage panel system including:

a cover composed of a textile; and a panel frame assembly that defines a void central opening, the panel frame assembly including a first frame that overlies a second frame, the second frame including at least one pivot receptacle configured to be rotatably coupled to the at least one pivot pin, and at least a portion of the cover is sandwiched between the first frame and the second frame such that a remainder of the cover spans the central opening, wherein the first frame and the second frame are composed of a polymer-based material.

10. The vehicle of claim 9, wherein the portion of the cover is wrapped around the first frame.

11. The vehicle of claim 10, wherein the first frame includes a first side opposite a second side, the portion of the cover is wrapped around the first side such that at least one terminal end of the cover is sandwiched between the second side of the first frame and the second frame.

12. The vehicle of claim 11, wherein the second side of the first frame includes a pair of flanges and a plurality of first ribs that include a central rib and a plurality of reinforcing ribs that are misaligned relative to the central rib, and the plurality of reinforcing ribs interconnect the pair of flanges to the central rib.

13. The vehicle of claim 12, wherein the second side of the first frame includes a boss, a third side of the second frame that faces the second side of the first frame includes a fastener bore, the fastener bore at least partially receives the boss and a mechanical fastener is coupled to the fastener bore and the boss.

14. The vehicle of claim 9, further comprising at least one tether, wherein the second frame includes at least one tether anchor, the at least one pivot receptacle is defined substantially opposite the at least one tether anchor, the at least one tether anchor receives the at least one tether to couple the at least one tether to the panel frame assembly and the at least one pivot receptacle is configured to receive a pivot pin associated with the rear compartment to movably couple the storage panel system to the rear compartment.

15. The vehicle of claim 14, wherein the second frame comprises a plurality of second frame members, and the at least one pivot receptacle is defined on one of the plurality of second frame members and the at least one tether anchor is defined on another one of the plurality of second frame members.

16. The vehicle of claim 9, wherein a region defined between an interior side of the cover and a boundary defined by a fourth side of the second frame is devoid of structural members.

17. A vehicle, comprising:

a cabin defining a passenger compartment and a rear compartment aft of the passenger compartment, the rear compartment including at least one pivot pin; and a storage panel system to cover a portion of the rear compartment, the storage panel system including:

a cover composed of a textile; and a panel frame assembly that defines a void central opening, the panel frame assembly including a first frame that overlies a second frame composed of a polymer-based material, the second frame including at least one pivot receptacle configured to be rotatably coupled to the at least one pivot pin and at least one tether anchor opposite the at least one pivot receptacle, and the cover is wrapped around the first frame such that at least a portion of the cover is sandwiched between the first frame and the second frame, and the cover spans the central opening.

18. The vehicle of claim 17, wherein the first frame includes a first side opposite a second side, the cover is wrapped around the first side such that at least one terminal end of the cover is sandwiched between the second side of the first frame and the second frame, and a remainder of the cover spans the central opening.

19. The vehicle of claim 17, wherein the second frame comprises a plurality of second frame members, and the at least one pivot receptacle is defined on one of the plurality of second frame members and the at least one tether anchor is defined on another one of the plurality of second frame members.

20. The vehicle of claim 17, wherein a region defined between an interior side of the cover and a boundary defined by a fourth side of the second frame is devoid of structural members.

\* \* \* \* \*